(12) United States Patent
Graf et al.

(10) Patent No.: US 7,123,991 B2
(45) Date of Patent: Oct. 17, 2006

(54) METHOD FOR THE EXCHANGE OF DATA BETWEEN CONTROLS OF MACHINES, PARTICULARLY ROBOTS

(75) Inventors: Stefan Graf, Zusamaltheim (DE); Michael Chaffee, Gaines, MI (US)

(73) Assignee: KUKA Roboter GmbH, Augsburg (DE)

( * ) Notice: Subject to any disclaimer, the term of this patent is extended or adjusted under 35 U.S.C. 154(b) by 228 days.

(21) Appl. No.: 10/628,703

(22) Filed: Jul. 28, 2003

(65) Prior Publication Data

US 2004/0083027 A1 Apr. 29, 2004

(30) Foreign Application Priority Data

Jul. 27, 2002 (DE) .............................. 102 34 233

(51) Int. Cl.
G06F 19/00 (2006.01)
(52) U.S. Cl. ................. 700/245; 700/258; 318/568.11; 901/27
(58) Field of Classification Search ................ 700/245, 700/257–258, 262, 264; 318/568.11; 606/1, 606/102, 130, 139; 901/1, 27; 701/213; 713/201; 380/270
See application file for complete search history.

(56) References Cited

U.S. PATENT DOCUMENTS

| | | | |
|---|---|---|---|
| 4,985,846 A * | 1/1991 | Fallon ........................ 382/153 |
| 6,356,806 B1 * | 3/2002 | Grob et al. .................. 700/245 |
| 6,397,259 B1 * | 5/2002 | Lincke et al. ................ 709/236 |
| 6,466,844 B1 * | 10/2002 | Ikeda et al. .................. 700/245 |
| 6,556,891 B1 * | 4/2003 | Hietmann et al. ........... 700/245 |
| 6,587,749 B1 * | 7/2003 | Matsumoto .................. 700/245 |
| 6,590,588 B1 * | 7/2003 | Lincke et al. ................ 715/744 |
| 6,665,611 B1 * | 12/2003 | Oran et al. .................. 701/213 |
| 6,807,461 B1 * | 10/2004 | Kneifel et al. .............. 700/248 |
| 6,853,881 B1 * | 2/2005 | Watanabe et al. ........... 700/264 |
| 2003/0135203 A1 * | 7/2003 | Wang et al. .................... 606/1 |

OTHER PUBLICATIONS

Vidal et al., Using RoboCup to teach multiagent systems and the distributed mindset, 2002, Internet, p. 1-5.*
Sisco CONFIDENTIAL, Introducing the Cisco Catalyst 2955: Enhancing industrial Ethernet Networks with intelligent services, 2001, Internet, p. 1-33.*
Bers et al., Robot teams with courgaarME over wireless ad hoc networks, 2004, Internet, p. 1-26.*

* cited by examiner

*Primary Examiner*—Thomas G. Black
*Assistant Examiner*—McDieunel Marc
(74) *Attorney, Agent, or Firm*—McGlew & Tuttle, P.C.

(57) ABSTRACT

To improve the exchange of data between controls of machines, particularly robots, a method is provided for the exchange of such data, wherein a first control produces an instruction to be transmitted with data to be sent to a second control and with an identification representing the second control. The instruction to be transmitted is provided with an identification of the first control, wherein the first control sends the instruction to be transmitted to the second control, wherein the second control evaluates the data of the instruction and wherein the second control provides the first control with an acknowledgment.

14 Claims, 3 Drawing Sheets

```
Def Server ( )        Control _____ 1
  :
  :
;-- wait for the clients to finish the old task--
RemoteCmd(Client_1_IP[],"Wait for Task==#Idle")
RemoteCmd(Client_2_IP[][],"Wait for
(Task==#Idle)")
;--spawn a new client task--
RemoteCmd (Client_1_IP[][],"Task=#Weld")
RemoteCmd (Client_2_IP[][],"Task=#Fetch")
  :
  :
;--do anything--
Fetch_Server_Part( )
  :
  :
RemoteCmd(Client_1_IP[][],"Wait for Task==#Idle")
RemoteCmd(Client_2_IP[][],"Wait for Task==#Idle")
  :
  :
End
```

```
Control  2:

Def Client_1( )
Loop
 Wait for Task<>#Idle
 Switch Task
  Case #Weld
    WeldPart( )
  Case #Fetch
    FetchPart( )
  Default
    Error Message...
 EndSwitch
 Task=#Idle
Endloop
End
```

```
Control  3:

Def Client_1( )
Loop
 Wait for Task<>#Idle
 Switch Task
  Case #Weld
    WeldPart( )
  Case #Fetch
    FetchPart( )
  Default
    Error Message...
 EndSwitch
 Task=#Idle
Endloop
End
```

Fig. 3

METHOD FOR THE EXCHANGE OF DATA BETWEEN CONTROLS OF MACHINES, PARTICULARLY ROBOTS

FIELD OF THE INVENTION

The invention relates to a method for the exchange of data between controls of machines, particularly robots.

BACKGROUND OF THE INVENTION

The transmission of data between controls of machines at present only takes place by means of direct links, either in the form of directly wired inputs and outputs or by means of data transmission field bus systems, while commands or instructions cannot be transmitted in this way. Commands must be given by means of operator elements or a mainframe computer. The corresponding data are transmitted as such directly between the two controls.

The hitherto known procedure is complicated, because physical inputs/outputs or the field bus system must be made available. Coincidence must be brought about on both controls, so that the inputs/outputs have the same significances. As the controls do not normally communicate directly via a field bus, but instead by means of an interposed plant programmable logic control (PLC), the latter must take account of a 1:1 mapping in the inputs/outputs. If communication between the controls is to be extended, this involves a change to the control programs of the input and output configuration (additional field bus words, additional lines for physical inputs/outputs, additional programming expenditure on the PLC side).

The problem of the invention is to overcome the indicated disadvantages and in particular permit a simplification and simple extendibility of communication between two or more controls, whilst largely eliminating fault-prone intermediate layers.

SUMMARY OF THE INVENTION

According to the invention the set problem is solved with a method of the aforementioned type, wherein a first control produces an instruction to be transmitted with data to be sent to a second control and with an identification representing said second control, wherein the instruction to be transmitted is provided with an identification of the first control, wherein the first control sends the instruction to be transmitted to the second control, wherein the second control evaluates the data of the instruction and wherein the second control supplies an acknowledgement to the first control.

The invention provides a single-line instruction which, apart from the actual data to be transmitted (physical states and/or control commands) comprises an identification of the receiver control. This creates simple extendibility of the communication by freely programmable commands as parameters of the control instruction (string commands), so that an increased transparency is possible in the user program by the use of freely programmable commands as parameters of the instructions and therefore the use of corresponding names for the commands instead of I/O designations. The invention makes extendibility very simple, because it is only necessary to declare a new global variable, which can then be used on the receiver control, because the latter can manipulate a random global variable. Extendibility is not limited by hardware resources. Apart from data, i.e. in particular physical states, it is possible to also transmit commands in this way. As a result of the invention data and command transmission to robots can take place flexibly without hardware/software expenditure on exchanging robots and without fixing a hierarchy, which is a prerequisite for direct cooperation of balanced robots. A further advantage is that the transmission takes place synchronously, so that the transmission initiator gains a direct acknowledgement concerning the result of the action and can only continue to operate when the command is performed on the other side. According to the invention, not only simple data can be transmitted, by means of a value allocation, but in targeted manner system states can be manipulated, such as the forcing of a step operating mode or the performance of a set selection in the other program.

According to a preferred development of the invention, the command to be transmitted is formatted as a UDP message and in particular the acknowledgement of the second control is also formatted as a UDP message. According to further developments of the invention, the second control compiles the data received in an internal code and in particular, if the transmitted data contain a control command, the second control executes the same. Finally, according to the invention, the first control only transmits an instruction to be transmitted to a further control on receiving therefrom an acknowledgement to the effect that the second control is ready to perform an instruction. The instruction to be transmitted can also contain the identification of the control in question and also the data to be transmitted in the form of a constant or variable.

BRIEF DESCRIPTION OF THE DRAWINGS

Further advantages and features of the invention can be gathered from the claims and the following description of an embodiment of the invention with reference to the attached drawings, wherein show:

FIG. 3A more precise representation of the processing of the data to be exchanged between controls in the same.

DETAILED DESCRIPTION OF THE DRAWINGS

Figure 1:
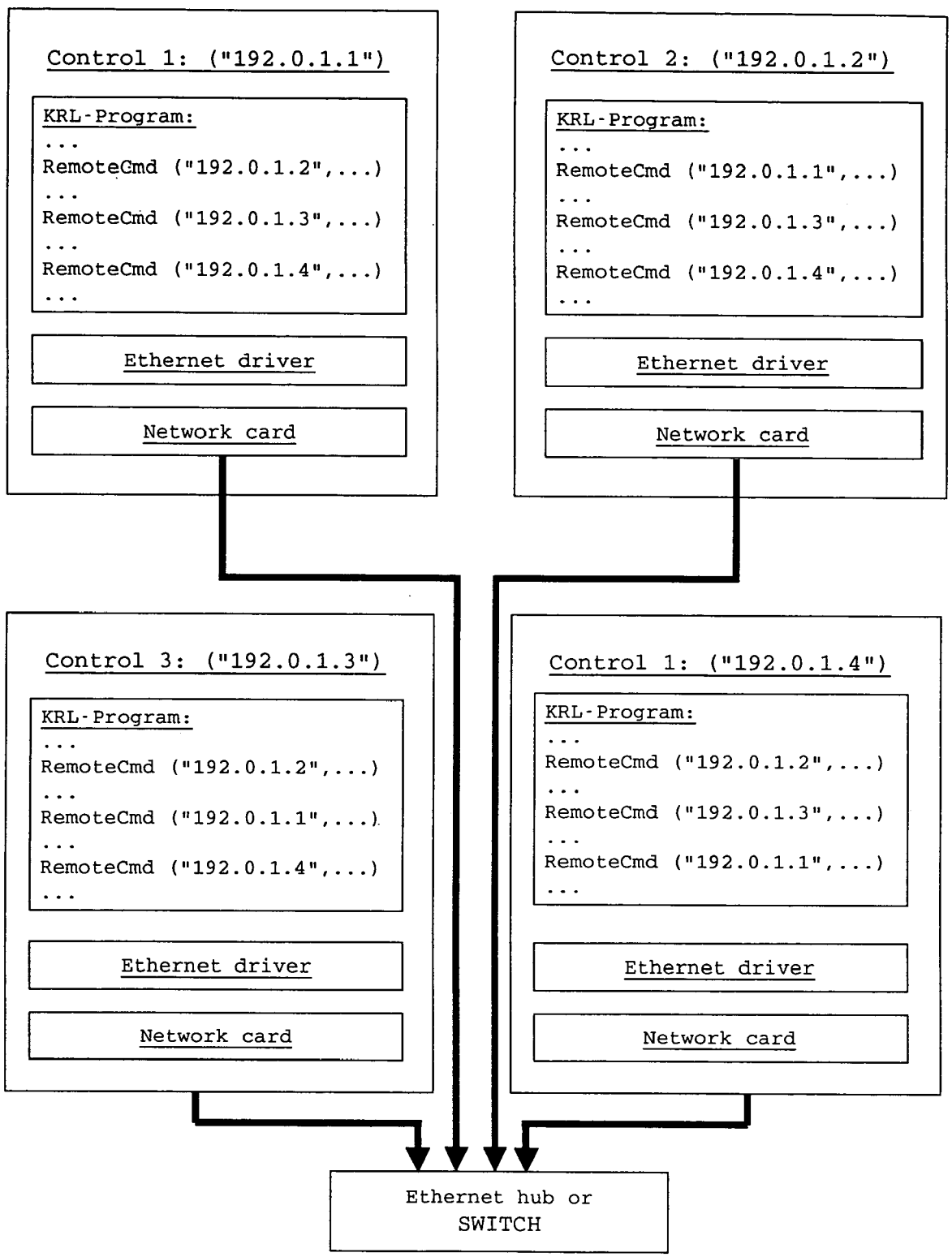
FIG. 1A diagrammatic representation of several mutually cooperating controls.
Figure 2:
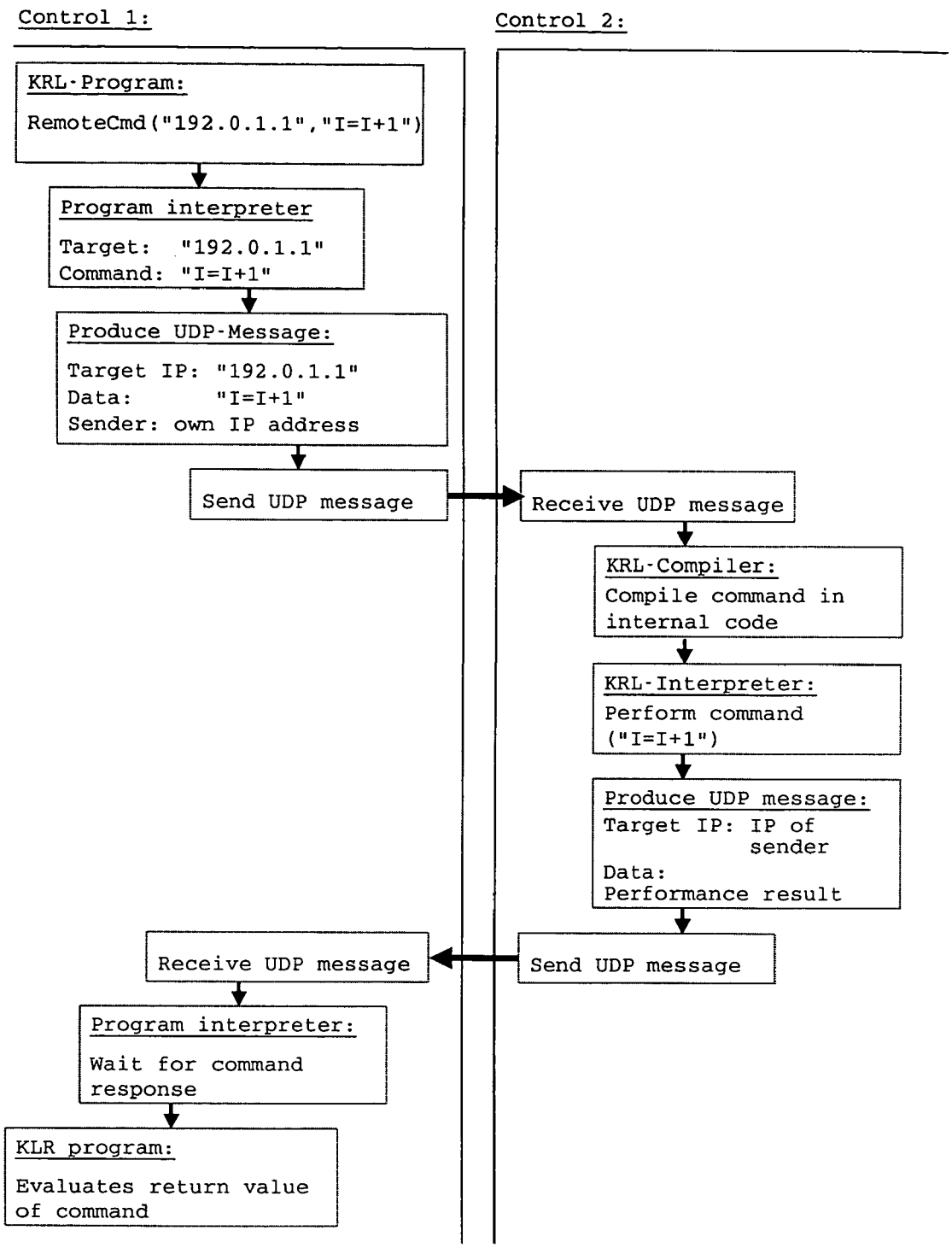
FIG. 2 The fundamental sequence of the method according to the invention for exchanging data between two controls.

FIG. 1 shows in exemplified manner four cooperating controls 1 to 4 with each of which is associated a clear address, IP="192.0.1.1" for control 1. Each control 1 to 4 has a computer 1.1 on which runs a control program for a machine, particularly for a robot controlled by the particular control. Each control also has an ethernet driver 1.2 to 4.2 and a network card 1.3 to 4.3 for communication with a network 5, by means of which the controls 1 to 4 are interconnected directly or by means of a switch. The memories contained in a control, such as read-only memories, volatile memories, etc., as well as peripherals, such as in particular input and output devices, are not shown. For data exchange purposes between two controls 1 and 2, initially a control program running on the first control produces an instruction to be transmitted, which on the one hand includes the data to be transmitted, such as physical parameters of the robot associated with the first control or also instructions for modifying physical parameters in a robot associated with the second control. The instruction to be transmitted also includes the address of the control to which the data or instructions produced by the program running on the first computer are to be transmitted. In addition, said instruction is provided with the sender's own address. This message is then transmitted as a UDP message via the network to the second control (FIG. 2). The latter receives the UDP message and then compiles the command to an internal control code. In the embodiment of FIG. 2, the interpreter of the control software running in the control 2 executes the command transmitted to it, namely I=I+1, i.e., increase by a value of "1" the physical quantity I. Then the control 2 produces an acknowledgement information, which on the one hand contains the address of the first control and on the other a statement concerning the performance result of the received and executed instruction. This message is sent back as a UDP message from control 2 to control 1, whose interpreter waits for this command response, received by the first control and evaluated by the control program of the first control and as a result of the evaluation optionally further instructions are sent by the first control to the second control.

In this and also in the example of FIG. 3 the control 1 acts as a server, whereas control 2 (or also control 3) operates as a client. Associations are not fixed and can instead be modified as a function of the tasks to be performed.

Before the control 1 sends a command to another control, control 2 and/or 3 in FIG. 3, control 1 initially waits for controls 2 and 3 to perform their tasks, optionally based on a remote control command and give a corresponding acknowledgement, as explained in connection with FIG. 2. Then a new command sequence is transmitted to the controls, namely to weld and to fetch a part.

Further remote control commands can follow. The control then again waits until the controls 2 and 3 (clients 1 and 2) have given an acknowledgement about the performance of the transmitted responses.

Controls 2 and 3 (clients 1 and 2) wait for a task, execute the commands received (weld, fetch) and then return to the idle/waiting state.

The address of the particular control can be used as a constant (e.g. RemoteCmd ("192.0.1.3", . . . )) or as a variable (e.g. IP[ ]="192.0.1.2" RemoteCmd(IP[ ], . . . )). The same applies regarding the data to be transmitted, which can also be fully used as a constant (RemoteCmd( . . . , "MyVar=44")) or a variable (CmdString[ ]="MyVar=055", RemoteCmd( . . . , CmdString[ ])).

Standard commands are the selection of a program on the control in question (RUNProgName( )), the resetting of a program (RESET), the cancellation of a program (CANCEL) and the allocation of a value to a global variable (value allocation) as simple values, strings or Boolean values or also in the form of complex allocations, such as sums, smaller/larger estimates and complex functions. Finally, a further possible command involves the waiting for a specific system state for the controlled control, such as e.g. the value of an input 1 becoming equal to that of an input 2; RemoteCmd(IP[ ], "wait for $IN[1]==$IN[2]").

LIST OF REFERENCE NUMERALS

1–4 Controls
1.1 Computer
1.2–4.2 Ethernet drivers
1.3–4.3 Network cards
5 Network

The invention claimed is:

1. A method for an exchange of data between controls of machines, particularly robots, wherein a first control produces an instruction to be transmitted with data to be sent to a second control and with an identification representing said second control, wherein the instruction to be transmitted is provided with an identification of the first control, wherein the first control sends the instruction to be transmitted to the second control, wherein the second control evaluates the data of the instruction and wherein the second control provides the first control with an acknowledgment, wherein the first control only transmits an instruction to be transmitted to a further control if it has received from the latter an acknowledgment to the effect that the second control is ready to perform an instruction.

2. The method according to claim 1, wherein the instruction to be transmitted is formatted as a UDP message.

3. The method according to claim 1, wherein the acknowledgment of the second control is formatted as a UDP message.

4. The method according to claim 1, wherein the second control compiles the data received to an internal code.

5. The method according to claim 1, wherein, if the data to be transmitted contain a control command, the second control executes the same.

6. The method according to claim 1, wherein the first control only transmits an instruction to be transmitted to a further control if it has received from the latter an acknowledgment to the effect that the second control is ready to perform an instruction.

7. The method according to claim 1, wherein the instruction to be transmitted can contain both the identification of the control in question and also the data to be transmitted as a constant or variable.

8. The method according to claim 1, wherein there are commands for the selection of a program on the second control (RUNProgName ( )), resetting a program of the second control (RESET), cancellation of a program of the second control (CANCEL), value allocations and/or commands for waiting on Boolean values.

9. A method for an exchange of data between controls of machines, particularly robots, wherein a first control produces an instruction to be transmitted with data to be sent to a second control and with an identification representing said second control, wherein the instruction to be transmitted is provided with an identification of the first control, wherein the first control sends the instruction to be transmitted to the second control, wherein the second control evaluates the data of the instruction and wherein the second control provides the first control with an acknowledgment wherein there are commands for the selection of a program on the second control (RUNProgName ( )), resetting a program of the second control (RESET), cancellation of a program of the second control (CANCEL), value allocations and/or commands for waiting on Boolean values.

10. The method according to claim 9, wherein the instruction to be transmitted is formatted as a UDP message.

11. The method according to claim 9, wherein the acknowledgment of the second control is formatted as a UDP message.

12. The method according to claim 9, wherein the second control compiles the data received to an internal code.

13. The method according to claim 9, wherein, if the data to be transmitted contain a control command, the second control executes the same.

14. The method according to claim 9, wherein the instruction to be transmitted can contain both the identification of the control in question and also the data to be transmitted as a constant or variable.

* * * * *